(12) United States Patent
Park et al.

(10) Patent No.: US 8,724,534 B2
(45) Date of Patent: May 13, 2014

(54) INFORMATION SERVICE APPARATUS AND METHOD IN WIRELESS COMMUNICATION SYSTEM

(75) Inventors: Young-Soo Park, Yongin-si (KR); Geun-Ho Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 794 days.

(21) Appl. No.: 12/469,008

(22) Filed: May 20, 2009

(65) Prior Publication Data

US 2009/0296621 A1    Dec. 3, 2009

(30) Foreign Application Priority Data

May 27, 2008    (KR) .................. 10-2008-0048974

(51) Int. Cl.
  *H04H 20/71*    (2008.01)
  *H04W 4/00*    (2009.01)

(52) U.S. Cl.
  USPC ........... 370/312; 370/230; 370/328; 370/329; 370/338

(58) Field of Classification Search
  None
  See application file for complete search history.

(56) References Cited

U.S. PATENT DOCUMENTS

| 6,298,239 | B1* | 10/2001 | Yonemoto et al. | 455/466 |
| 7,260,079 | B1* | 8/2007 | Chapman et al. | 370/338 |
| 2002/0061021 | A1* | 5/2002 | Dillon | 370/390 |
| 2006/0050672 | A1* | 3/2006 | Shim et al. | 370/338 |
| 2006/0126556 | A1* | 6/2006 | Jiang et al. | 370/328 |
| 2008/0056219 | A1* | 3/2008 | Venkatachalam | 370/342 |

FOREIGN PATENT DOCUMENTS

| KR | 10-2002-0010335 A | 2/2002 |
| KR | 10-2001-0046769 A | 6/2002 |
| KR | 10-2004-0033527 A | 4/2004 |
| KR | 10-2007-0097931 A | 10/2007 |

* cited by examiner

*Primary Examiner* — Ian N Moore
*Assistant Examiner* — Brian T Le
(74) *Attorney, Agent, or Firm* — Jefferson IP Law, LLP

(57) ABSTRACT

An information service apparatus and method in a wireless communication system are provided. A method of operating a Radio Access Station (RAS) includes receiving information regarding business offices located in a cell coverage area of the RAS from a network entity of a core service network, classifying the received business office information according to a plurality of items and storing the classified information in a Data Base (DB), allocating a Multicast Connection IDentifier (MCID) for each item, determining a transmission period for each item, obtaining a business office list of a corresponding item from the DB when a Transmit (Tx) time elapses according to the Tx period, generating an advertisement multicast burst including the obtained business office list, and multicasting the generated burst to pre-registered Mobile Stations (MSs).

21 Claims, 7 Drawing Sheets

INFORMATION SERVICE APPARATUS AND METHOD IN WIRELESS COMMUNICATION SYSTEM

PRIORITY

This application claims the benefit under 35 U.S.C. §119(a) of a Korean patent application filed in the Korean Intellectual Property Office on May 27, 2008 and assigned Serial No. 10-2008-0048974, the entire disclosure of which is hereby incorporated by reference.

BACKGROUND OF THE INVENTION

1. Field of the Invention

The present invention relates to an information service apparatus and method in a wireless communication system. More particularly, the present invention relates to an apparatus and method in which a Radio Access Station (RAS) transmits information regarding business offices nearby to pre-registered Mobile Stations (MSs) in a wireless communication system.

2. Description of the Related Art

Currently, advertising is conducted using various mass media to announce products or tangible/intangible services. In general, the mass media include paper media (e.g., newspapers, magazines, etc.) and over-the-air broadcast media (e.g., television broadcast, radio broadcast, etc.). Such advertising using mass media aims at an unspecified number of users without considering regions and preferences of customers. This results in inefficiency in that an advertiser who places an advertisement has to pay the required price while the expectation of success based on the advertisement may not be satisfied.

To avoid the inefficiency caused by advertising using the mass media, the amount of on-line advertising using an Internet communication network has been increasing in recent years. However, the on-line advertising using the Internet communication network also has limitations in that a user must access the Internet in order to receive the advertisement through the Internet.

In addition, with the widespread use of mobile terminals that can be carried and used at any time and any place, advertising using the mobile communication system has recently drawn customer attention. Up to now, advertising using a mobile communication network has been aimed at an unspecified number of users in all regions based of the concept in which information is broadcast irrespective of locations and preferences of subscribers. As such, if the advertising aims at an unspecified number of users in all regions, there is a limitation in that an advertising service specialized for each region cannot be provided.

For example, if a workplace of a business office is located in a specific region, an advertisement directed at customers located in that region can be more effective. In addition, when a user visits the specific region, the user may desire to know region-specific information (e.g., restaurants, accommodations, tourist attractions, and the like) in that region.

Accordingly, in order to more effectively use the advertisement aimed at the mobile communication network for an important value added service, there is a need to increase advertising efficiency by providing practical information to users.

SUMMARY OF THE INVENTION

An aspect of the present invention is to address at least the above-mentioned problems and/or disadvantages and to provide at least the advantages described below. Accordingly, an aspect of the present invention is to provide an apparatus and method for multicasting regional information to pre-registered Mobile Stations (MSs) in a wireless communication system.

Another aspect of the present invention is to provide an apparatus and method for classifying regional information for all items and for multicasting the information for each item to pre-registered MSs in a wireless communication system.

Still another aspect of the present invention is to provide an apparatus and method for grouping subscribers subscribed to an advertisement service according to preference information and for multicasting specific regional information to MSs of a certain group in a wireless communication system.

Yet another aspect of the present invention is to provide an apparatus and method in which a Radio Access Station (RAS) periodically multicasts information regarding business offices located in a cell coverage area of the RAS to pre-registered MSs in a wireless communication system.

In accordance with an aspect of the present invention, a method of operating an RAS in a wireless communication system is provided. The method includes receiving information regarding business offices located in a cell coverage area of an RAS from a network entity of a core service network, classifying the received business office information according to a plurality of items and storing the classified information in a Data Base (DB), allocating a Multicast Connection IDentifier (MCID) for each item, determining a transmission period for each item, obtaining a business office list of a corresponding item from the DB when a Transmit (Tx) time elapses according to the Tx period, generating an advertisement multicast burst including the obtained business office list, and multicasting the generated burst to pre-registered MSs.

The aforementioned aspect of the present invention may further include, upon detecting an access of a new MS, obtaining subscription information of the MS by performing authentication, determining whether the MS is a subscriber of an advertisement service using the subscription information, if the MS is the subscriber of the advertisement service, determining at least one of a preference item and a preference time using the subscription information, joining the MS to a corresponding multicast group using at least one of the preference item and the preference time, and transmitting to the MS at least one of the preference time and the MCID of at least one multicast group in which the MS is joined.

In accordance with another aspect of the present invention, a method of operating an MS in a wireless communication system is provided. The method includes receiving at least one of an advertisement MCID for a preference item and a pre-registered preference time from RAS in an initial access process, determining whether an advertisement burst corresponding to the MCID is received from the RAS, if the advertisement burst is received, determining whether advertisement reception is currently activated, if the advertisement reception is currently activated, obtaining information regarding the preference item by decoding the received advertisement burst, and reproducing information regarding the preference item using an application program.

In accordance with still another aspect of the present invention, an information service method in a wireless communication system is provided. The method includes classifying information regarding business offices subscribed to an advertisement service according to a cell and delivering the classified business office information to a corresponding RAS by an information provider server, classifying business office information provided from the information provider server for all items and allocating an MCID for each item by the RAS, and, if an initial access of an MS is detected, performing authentication on the MS by interoperating with an authentication server by the RAS, and, if the authentication is successful, examining whether the MS is a subscriber of an advertisement service using subscription information of the MS by the RAS, and, if the MS is the subscriber of the advertisement service, determining a preference item and a preference time of the MS and transmitting the preference time and an MCID depending on the preference item to the MS by the RAS, examining a Tx period of each item, and, if a Tx time elapses according to the Tx period, configuring a broadcast multicast burst using a business office list of a corresponding item by the RAS, and multicasting the configured burst to pre-registered MSs by the RAS.

In accordance with yet another aspect of the present invention, an RAS apparatus in a wireless communication system is provided. The apparatus includes a first DB for storing information regarding business offices located in a cell coverage area of an RAS and received from an information provider server, a second DB for determining whether an MS currently accessed the RAS is a subscriber of an advertisement service, and, if the MS is the subscriber of the advertisement service, for managing a preference item list and a preference time, a third DB for managing a list of MSs that desire to receive a corresponding item among a plurality of items and an MCID allocated to the corresponding item, a controller for determining a Tx period for each item, and, if a Tx time for the Tx period elapses, for obtaining a business office list of the corresponding item from the first DB and for generating an advertisement multicast burst including the obtained business office list, and a transmitter for performing physical layer processing on the burst received from the controller to multicast the processed burst to pre-registered MSs.

In accordance with another aspect of the present invention, an MS apparatus in a wireless communication system is provided. The apparatus includes a controller for receiving at least one of an advertisement MCID for a preference item and a pre-registered preference time from an RAS in an initial access process, for determining whether an advertisement burst corresponding to the MCID is received from the RAS, and if the advertisement burst is received, for determining whether advertisement reception is currently activated, a decoder for obtaining information regarding the preference item by decoding the received advertisement burst if the advertisement reception is currently activated, and a reproducer for reproducing information regarding the preference item using an application program.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
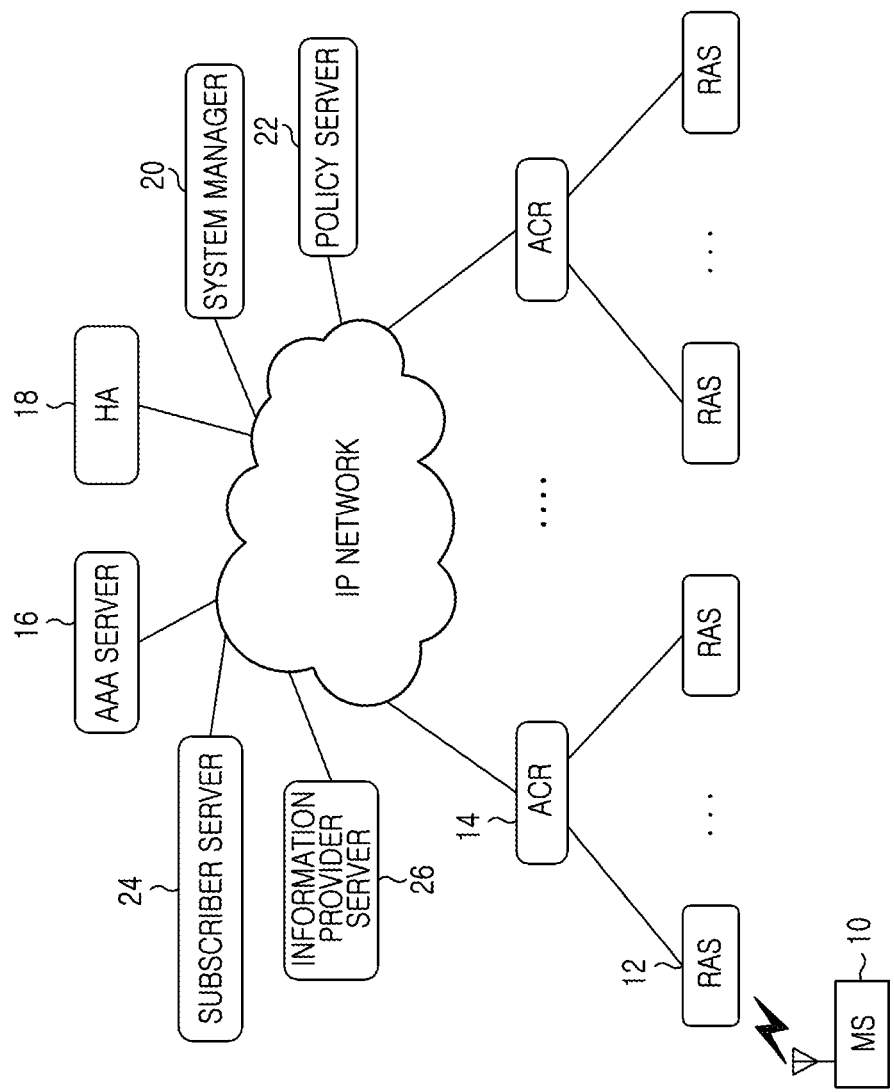
FIG. 1 illustrates a network configuration according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions will be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An exemplary method of multicasting specific regional information to pre-registered Mobile Stations (MSs) in a wireless communication system will be described. In the method described below, a Radio Access Station (RAS) classifies regional information for all items, and multicasts the information for each item to the pre-registered MSs.

The following description is made in context of an Orthogonal Frequency Division Multiplexing/Orthogonal Frequency Division Multiple Access (OFDM/OFDMA)-based broadband wireless access communication system. However, exemplary embodiments of the present invention are not limited to an OFDM-based system. Thus, it should be clearly understood that the present invention is also applicable to any other type of wireless communication system for providing multicast and broadcast services. In general, the Broadcast Wireless Access (BWA) communication system has a cell radius of about 1 km, which is smaller than that of Code Division Multiple Access (CDMA)-based 2nd and 3rd generation systems. Therefore, it is possible and proper that each RAS provides corresponding regional information.

In the following description, a Network Entity or Network Element (NE) is a term defined according to functions, and the term may vary depending on the applicable standardization group or operator's intention. For example, an RAS may also be referred to as an Access Point (AP), a Node-B, or a Base Station (BS). In addition, an Access Control Router (ACR) may also be referred to as a Radio Network Controller (RNC), a Base Station Controller (BSC), or an Access Service Network-Gateway (ASN_GW).

FIG. 1 illustrates a network configuration according to an exemplary embodiment of the present invention.

Referring to FIG. 1, a network is configured with an MS 10, an RAS 12, an Access Control Router (ACR) 14, an Authentication, Authorization, Accounting (AAA) server 16, a Home Agent (HA) 18, a system manager 20, a policy server 22, a subscriber server 24, and an information provider server 26. A network consisting of the RAS 12 and the ACR 14 may be defined as an Access Service Network (ASN). The system manager 20 may be referred to as a WiBro System Manager (WSM), an Element Management System (EMS), an Operating and Maintenance Center (OMC), etc. The servers 16 to 26 are functional entities, and may include separate servers or may be incorporated into one server by combining several functional entities. A Common Open Policy Service (COPS) interface, a Remote Authentication Dial In User Service (RA-DIUS) interface or a Diameter interface may be used as an interface between NEs.

The AAA server 16 performs authentication and accounting on the MS by interoperating with the ACR 14. The policy server 22 provides policy information (e.g., Quality of Service (QoS) policy information) determined by a service provider (or operator) to a corresponding NE. The system manager 20 delivers information related to the network configuration to the ASN, and manages the ACR 14 and the RAS 12 which constitute the ASN.

The HA 18 includes location information of mobile nodes which use their networks as home networks. Whenever the nodes move, the HA 18 newly modifies mobility binding information for the mobile nodes by performing a registration process. When the mobile nodes move to an external network, a Foreign Agent (FA) (not shown) acts as a mediator so that the mobile nodes may be registered to the HA 18. Further, the FA releases a tunneling datagram provided from the mobile nodes and delivers the datagram to the mobile nodes. In general, the FA may be located in a specific NE (e.g., ASN_GW) within the ASN or may exist as a separate NE. Although not shown, a Dynamic Host Configuration Protocol (DHCP) server may be provided to allocate Internet Protocol (IP) addresses to MSs, and a Domain Name Server (DNS) may be provided to manage a mapping relation between a Network Access IDentifier (NAI) and an IP address.

The subscriber server 24 manages information regarding subscribers of a service of a Network Access Provider (NAP). Examples of the NAP include Korea Telecom (KT), SK Telecom (SKT), etc. For each subscriber, the subscriber server 24 may manage a mobile phone number, a name, an address, a payment rate, a subscribed value-added service list, etc. If a subscriber is subscribed to an advertisement service according to an exemplary embodiment of the present invention, the subscriber server 24 may additionally manage a preference item (e.g., a gas station, an accommodation, a flower shop, a hypermarket, etc.) registered by the subscriber, a preference region (e.g., Jongno district of Seoul, Mapo district of Seoul, Youngtong district of Suwon, Shinchon district of Seoul, etc.), a preference time zone (e.g., 10 a.m. to 5 p.m. of Saturday/Sunday), a reception period (e.g., 10 minutes, 20 minutes, 1 hour, etc.), etc. It is assumed herein that subscriber server 24 is located in a Core Service Network (CSN) and includes an application layer. That is, the subscriber server 24 includes a Web server function, and the subscriber may modify subscription information of the subscriber by accessing the subscriber server 24 according to an application layer protocol (e.g., HyperText Transfer Protocol (HTTP)). The function of the subscriber server 24 may be included in the AAA server or other servers, or may exist as a separate server.

The information provider server 26 manages information regarding business offices subscribed to an advertisement service of the NAP. That is, for each business office, the information provider server 26 may manage an item type (e.g., a gas station, an accommodation, a flower shop, a hypermarket, etc.), a location (e.g., an identifier of an RAS that manages an advertisement), an address, a phone number, event information (e.g., discount information, an electronic coupon, etc.), a homepage address link, a class, etc. It is assumed herein that the information provider server 26 is located in the CSN and includes an application layer. That is, the information provider server 26 includes a Web server function, and a service provider of a business office may modify subscription information of the service provider by accessing the information provider server 26 according to an application layer protocol (e.g., HTTP). The information provider server 26 classifies information regarding the business offices registered to a Data Base (DB) according to locations of the business offices, e.g., according to an RAS identifier, and then provides the classified information regarding the business offices to a corresponding RAS.

The ACR 14 transmits traffic from the core network to the RAS 12, and transmits traffic from the RAS 12 to the core network. The ACR 14 manages a Service Flow (SF), a connection, and mobility for each MS. For example, the ACR 14 may generate a unique SF for each UpLink (UL) and DownLink (DL) connection.

The RAS 12 transmits traffic from the ACR 14 to the MS 10, and transmits traffic from the MS 10 to the ACR 14. The RAS 12 may be connected to the ACR 14 in a wired fashion, and may be connected to the MS 10 in a wireless fashion. The RAS 12 allocates resources to the MS 10 by performing scheduling according to a Quality of Service (QoS) of a Media Access Control (MAC) layer. A network between the ACR 14 and the RAS 12 may be configured with a Layer 2 (L2: Ethernet) network or a Layer 3 (L3: IP) network.

According to exemplary embodiments of the present invention, the RAS 12 registers corresponding business office information (e.g., an item, an address, a phone number, event information, a homepage address link, etc.) from the information provider server 26 in the DB, and multicasts or broadcasts the business office information registered in the DB according to a rule. More specifically, the RAS 12 classifies the business office information for each item, allocates a Multicast Connection IDentifier (MCID) for each item, and reports the allocated MCID to MSs subscribed to a corresponding advertisement service. The MCID may be reported using a broadcast message (e.g., a Downlink Channel Descriptor (DCD) message, etc.) or may be reported individually to the MSs by performing a Dynamic Service Addition (DSA) process. Further, the RAS 12 may report MCIDs for all items desired by the MSs by performing the DSA process only one time.

The RAS 12 multicasts the business office information for each item to pre-registered MSs using a corresponding MCID. The information for each item may be multicast with a certain period. A Transmit (Tx) time and a Tx period for each item may be differently determined. For example, an item 1 (e.g., a hypermarket) may be multicast every 3 minutes, and an item 2 (e.g., a gas station) may be multicast every 2 minutes. Further, for MSs that desire the same item, the RAS 12 may determine a wakeup period in an idle state so that the same wakeup period is determined for the MSs. When the MSs wake up, the RAS 12 may multicast information regarding a corresponding item.

When the MS 10 initially accesses the RAS during a power-on or handover process, the MS 10 receives an MCID for a desired item using a broadcast message or by performing a DSA process and also receives preference time information related to a user. In an exemplary implementation, the preference time information may be pre-registered. Further, the MS 10 receives advertisement information of the item using the MCID and the preference time and then displays the received advertisement information. In general, the MS 10 may receive and display an advertisement in an idle state where there is no traffic communication. That is, the MS 10 may wake up according to a wakeup period negotiated with the RAS 12 to determine whether the advertisement is received. If corresponding MCID information is included in a MAP message, the MS 10 may decode and reproduce a burst (i.e., advertisement information) of a corresponding MCID.

Figure 2:
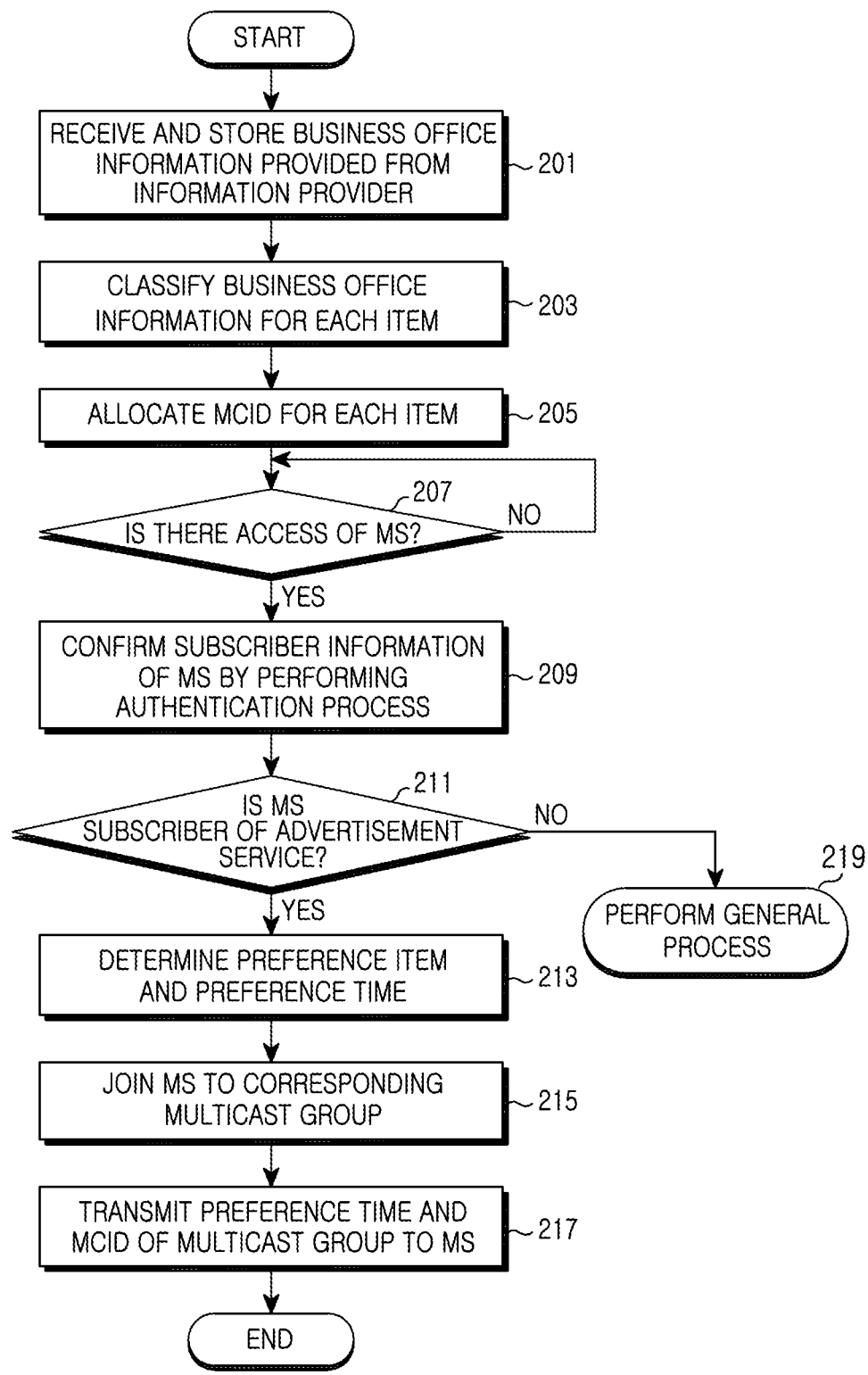
FIG. 2 is a flowchart illustrating an operation process of a Radio Access Station (RAS) in a wireless communication system according to an exemplary embodiment of the present invention.

FIG. 2 is a flowchart illustrating an operation of an RAS in a wireless communication system according to an exemplary embodiment of the present invention.

Referring to FIG. 2, in step 201, the RAS receives information regarding business offices located in a cell coverage area of the RAS from the information provider server 26 and then stores the received information. For each business office, the information regarding the business offices may include an item type (e.g., a restaurant, a gas station, an accommodation, a hypermarket, etc.), an address, a phone number, event information (e.g., discount information, an electronic coupon, etc.), a homepage address link, a class (e.g., premium, gold, silver, bronze, etc.), etc. The class may be determined according to an advertisement expense paid to a mobile communication provider (i.e., NAP). When a list of business offices is configured for each item, the RAS may locate a business office having a high class to an upper position (or a first page) of the list so that differentiation may be supported according to the class.

In step 203, the RAS classifies the stored business office information for each item. That is, the business office list is configured according to each item. In this case, the list may be configured so that a business office having a high class is located at an upper position of the list. In step 205, the RAS allocates an MCID for each classified item. Such an operation may be performed whenever the business office information is received from the information provider server. When the operation results in changes in the MCID for each item, the changed MCID has to be reported to MSs. Although it is described that the MCID for each item is allocated by the RAS, the allocation of the MCID may be performed by the information provider server 26 or the system manager 20.

In step 207, the RAS determines whether there is an access by a new MS. If there is an access by the new MS, the RAS performs an initial access process on the MS in step 209. In this step, the initial access process may include a ranging process (i.e., RaNGing-REQuest (RNG-REQ)/RaNGing-ReSPonse (RNG-RSP)), a capability negotiation process (i.e., SS Basic Capability negotiation (SBC)-REQ/SBC-RSP), an authentication process, a registration process, etc. Meanwhile, the RAS may confirm subscription information (e.g., a user class, a subscribed value added service list, etc.) of the MS by performing the authentication process in step 209.

After completion of the initial access process, the RAS determines whether the MS is a subscriber of an advertisement service using the subscription information in step 211. If the MS is not a subscriber of the advertisement service, the RAS performs a general process in step 219. Otherwise, if the MS is a subscriber of the advertisement service, the RAS determines a preference item and a preference time using the subscription information in step 213. It is assumed herein that a user may determine at least one preference item and at least one preference time in advance.

In step 215, the RAS joins the MS to a corresponding multicast group using the determined preference item and/or preference time. For example, if a current time is included in the preference time, the RAS may join the MS to a multicast group corresponding to the preference item. If the current time is not included in the preference time, the RAS may manage the MS by classifying the MS into a preliminary group. The RAS may delete the MS from the corresponding multicast group by periodically examining a preference time of MSs joined to each multicast group. In this case, the RAS may transmit an indication message to the MS to disable advertisement reception. Further, the RAS may join the MS to the corresponding multicast group by periodically examining a preference time of MSs belonging to the preliminary group. In this case, if an MS newly joined to the multicast group does not know an MCID of a corresponding multicast group, the RAS may report the MCID to the MS by performing a DSA process or the like. As such, the RAS may examine the preference time of the MSs, and thus may configure a multicast group by gathering MSs (i.e., MSs having the same preference item) which currently desire advertisement reception.

In step 217, the RAS transmits the MCID of at least one multicast group in which the MS is joined and the preference time to the MS. For example, the RAS may report the MCID and the preference time to the MS by performing the DSA process. The DSA process is described herein as an example only and may be omitted or substituted with another process. Thus, the MCID may be added in a format of Type/Length/Value (TLV) of a predefined message or may be transmitted using a newly defined message.

Figure 3:
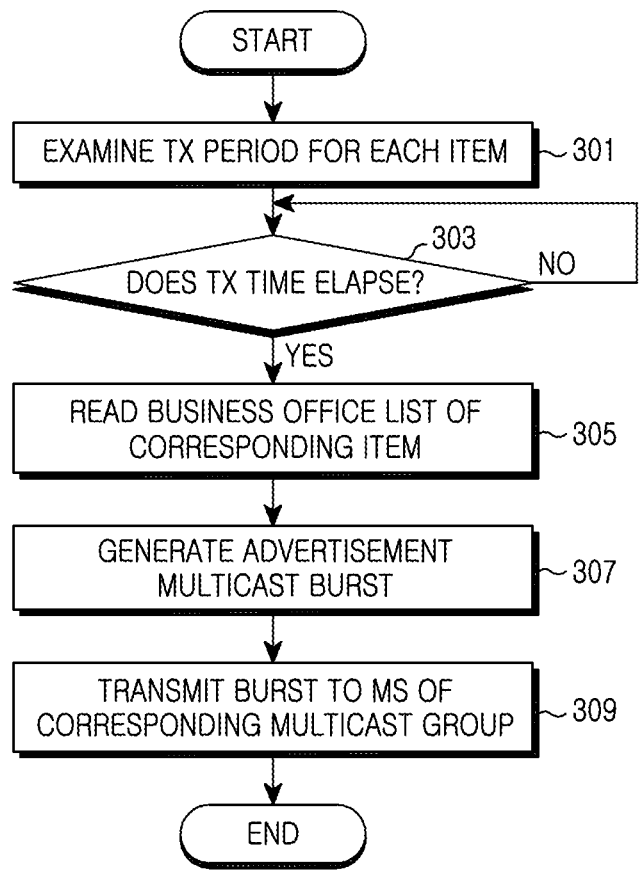
FIG. 3 is a flowchart illustrating an operation process of an RAS in a wireless communication system according to an exemplary embodiment of the present invention.

FIG. 3 is a flowchart illustrating an operation of an RAS in a wireless communication system according to an exemplary embodiment of the present invention. In the exemplary method of FIG. 3, information regarding business offices located in a cell coverage area of the RAS is multicast for all items.

Referring to FIG. 3, the RAS examines Tx periods for all items in step 301. The Tx periods for all items may be identical to or different from one another. Even if the Tx periods are identical to one another, Tx times may be regulated to be different from one another, thereby avoiding a phenomenon in which an advertisement is concentrated in a specific frame. For example, in a case where a frame number is divided by '10', if a residual thereof is 3, business office information of a first item may be transmitted, and if the residual is 7, business office information of a second item may be transmitted.

In step 303, the RAS examines whether a Tx time of business office information elapses according to the Tx period. If the Tx time elapses, the RAS reads a business office list of a corresponding item from a DB in step 305. In step 307, the RAS configures an advertisement multicast burst (or message) including the read business office list. In step 309, the RAS transmits the configured burst to MSs belonging to a corresponding multicast group.

Figure 4:
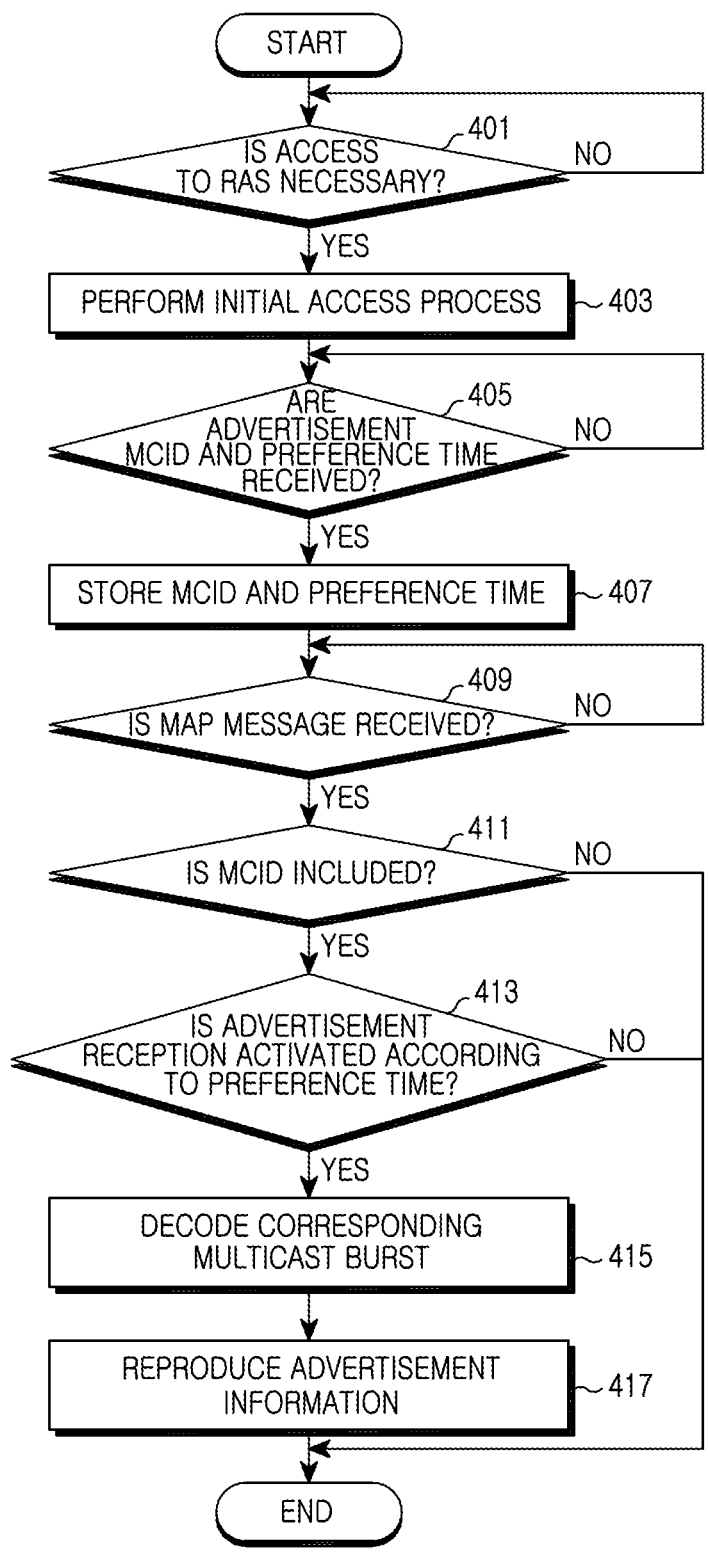
FIG. 4 is a flowchart illustrating an operation process of a Mobile Station (MS) in a wireless communication system according to an exemplary embodiment of the present invention.

FIG. 4 is a flowchart illustrating an operation of an MS in a wireless communication system according to an exemplary embodiment of the present invention.

Referring to FIG. 4, the MS determines whether there is a need to access an RAS in step 401. In general, the MS attempts an initial access to the RAS during a power-on or handover process. If there is a need to access the RAS, the MS performs an initial access process on the RAS in step 403. For example, the initial access process may include a ranging process, a capability negotiation process, an authentication process, a registration process, etc.

After completion of the initial access process, in step 405, the MS examines whether an MCID for advertisement reception and preference time information registered by a user are received from the RAS. For example, the MCID for advertisement reception may be received using any one of a broadcast message (e.g., a DCD message) and a message exchanged for the initial access process, or using a DSA message. If the MCID for advertisement reception and the preference time information are received, the MS stores the received MCID in a memory and determines a preference time for advertisement reception in step 407.

After obtaining the MCID for advertisement reception, the MS examines whether a MAP message is received in step 409. If the MS is in an idle state, the MS wakes up at a period negotiated with the RAS to receive the MAP message.

Upon receiving the MAP message, in step 411 the MS decodes the MAP message (i.e., a DL MAP message or a Multicast Broadcast Service (MBS) MAP message) and determines whether an Information Element (IE) containing the MCID is included in the MAP message. In other words, the MS determines whether an advertisement burst to be received by the MS exists in a current frame.

If the IE containing the MCID exists, the MS examines whether advertisement reception is currently activated according to the determined preference time in step 413. As described above, it is assumed that the activation of advertisement reception may be determined according to the preference time received from the RAS in an initial access process or may be determined by a user. It is also assumed that a time zone (e.g., 1 p.m. to 3 p.m.) for receiving an advertisement may be determined by the user.

If advertisement reception is inactivated, the procedure of FIG. 4 ends. Otherwise, if advertisement reception is activated, the MS receives a burst containing advertisement information (i.e., business office information) in a region indicated by a corresponding IE and decodes the received burst in step 415. In step 417, the MS reproduces the advertisement information using an application layer program. That is, the MS displays the advertisement information on a screen, and if necessary, outputs sound through a speaker. In this case, the advertisement information may be displayed within a range that does not interfere with execution of another application (e.g., Internet, e-mails, messages, etc.). For example, the advertisement information may be displayed in a portion of a full screen (e.g., in a lower portion of a screen) in a banner format.

Figure 5:
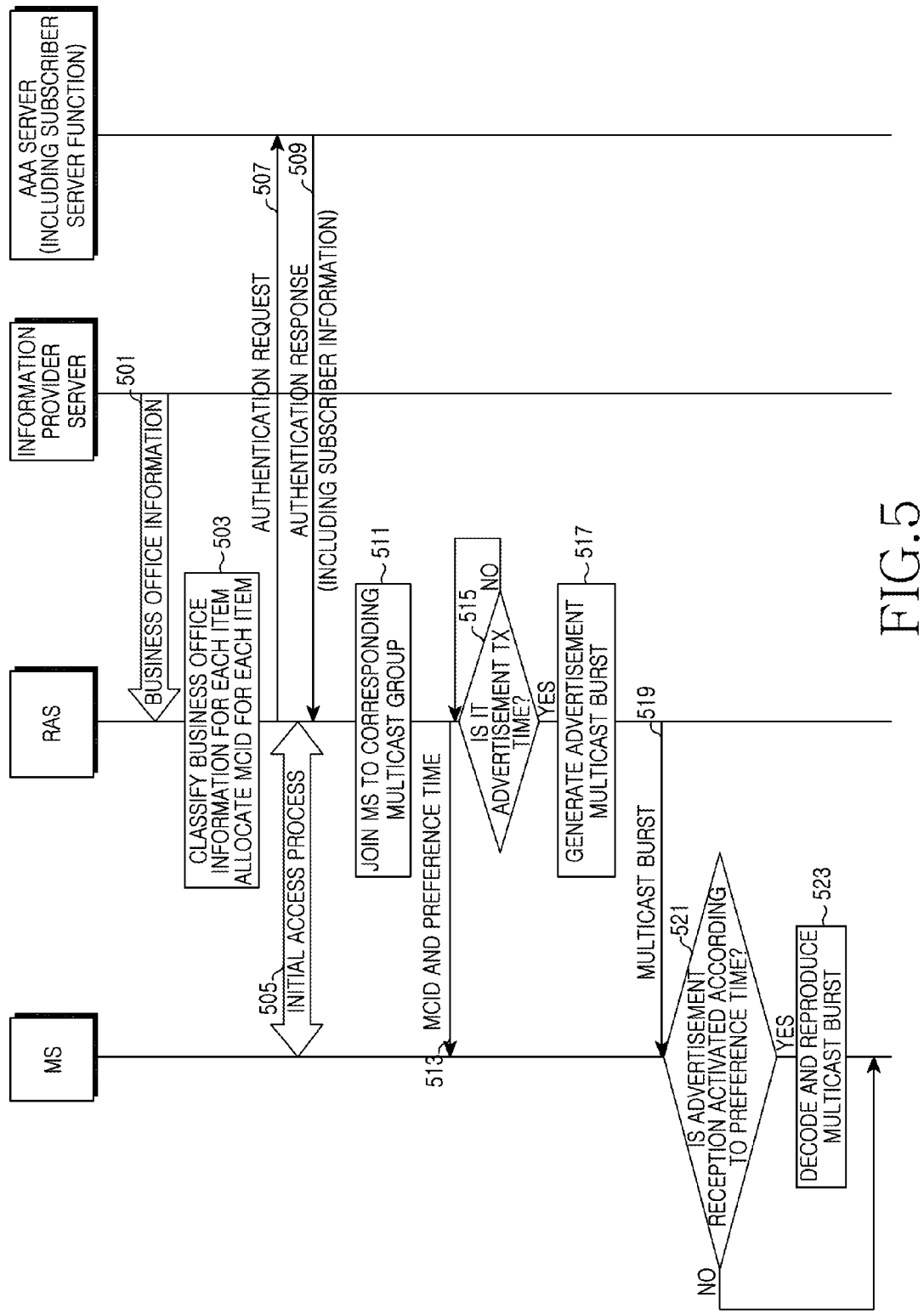
FIG. 5 illustrates a signal exchange process according to an exemplary embodiment of the present invention.

FIG. 5 illustrates a signal exchange process according to an exemplary embodiment of the present invention.

Referring to FIG. 5, in step 501, an information provider server classifies business offices registered in a DB according to a cell at which a corresponding business office is located, and delivers the classified business office information to a corresponding RAS according to a period, a triggering event, or a request. For each business office, the business office information may include an item type, an address, a phone number, event information, a homepage address link, a class, etc.

In step 503, the RAS classifies business office information for each item, and allocates an MCID for each item. The business office information corresponds to a business office located in a cell coverage area of the RAS and is received from the information provider server. That is, the RAS configures a business office list for each item. In this case, the list may be configured so that information regarding a business office with a high class may be located at an upper position (e.g. a first page) of the list.

If an initial access is necessary as a result of a power-on or handover process, the MS performs an initial access process on the RAS in step 505. The initial access process includes a ranging process, a capability negotiation process, an authentication process, a registration process, etc.

During the initial access process, the RAS requests an AAA sever to authenticate the MS in step 507. In step 509, the AAA server performs authentication on the MS, and if authentication is successful, transmits an authentication success response message to the RAS. It is assumed herein that the AAA server includes a function of the subscriber server 24 of FIG. 1, and if authentication on the MS is successful, transmits subscription information of the MS (e.g., whether the MS is subscribed to an advertisement service) to the RAS. If the RAS is included in a region preferred by the MS to receive an advertisement, the AAA server provides a preference item, a preference time, or the like of the MS to the RAS.

Upon receiving the subscription information regarding the MS, in step 511, the RAS determines the preference item and the preference time from the subscription information, and joins the MS to a corresponding multicast group according to the determined preference item and preference time. In step 513, the RAS transmits to the MS the preference time and an MCID of at least one multicast group in which the MS is joined. For example, the RAS may report an MCID list and the preference time to the MS by performing a DSA process. Then, the MS determines the MCID and the preference time.

In step 515, the RAS examines a Tx period for each item, and determines whether an advertisement Tx time elapses according to the Tx period. If the advertisement Tx time elapses, in step 517, the RAS reads a business office list of a corresponding item from a DB, and configures an advertisement multicast burst including the read business office list. In step 519, the RAS multicasts the configured advertisement multicast burst to MSs of a corresponding multicast group.

The MS decodes a MAP message (i.e., a DL MAP message or an MBS MAP message) received from the RAS, and determines whether an MCID of a preference item is included in the MAP message. If the MCID of the preference item exists, in step 521, the MS examines whether advertisement reception is currently activated according to the determined preference time. As described above, it is assumed that activation of advertisement reception may be determined according to the preference time received from the RAS in an initial access process or may be determined by a user.

If advertisement reception is inactivated, the MS gives up decoding of a burst corresponding to the MCID. Otherwise, if advertisement reception is activated, the MS receives a burst (or a packet) including advertisement information in a region indicated by a corresponding MAP Information Element (IE) and decodes the received burst in step 523. In addition, the MS reproduces the advertisement information using an application layer program. In this case, the advertisement information may be displayed in a portion of a full screen (e.g., in a lower portion of a screen) in a banner format.

Figure 7A:
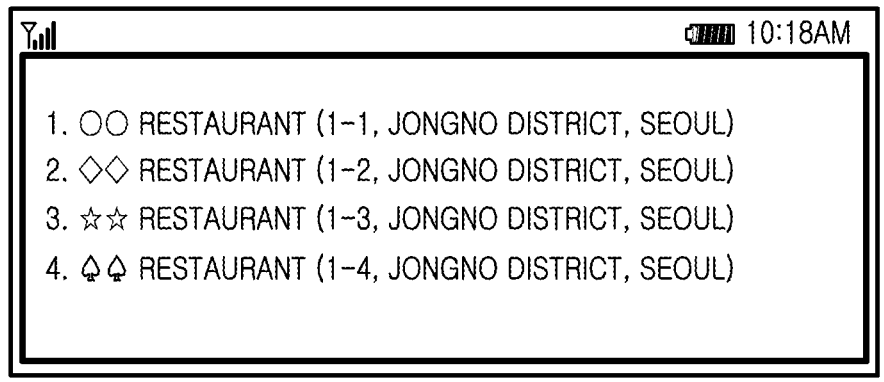
FIGS. 7A and 7B illustrate an example of advertisement information displayed on a screen.
Figure 7B:
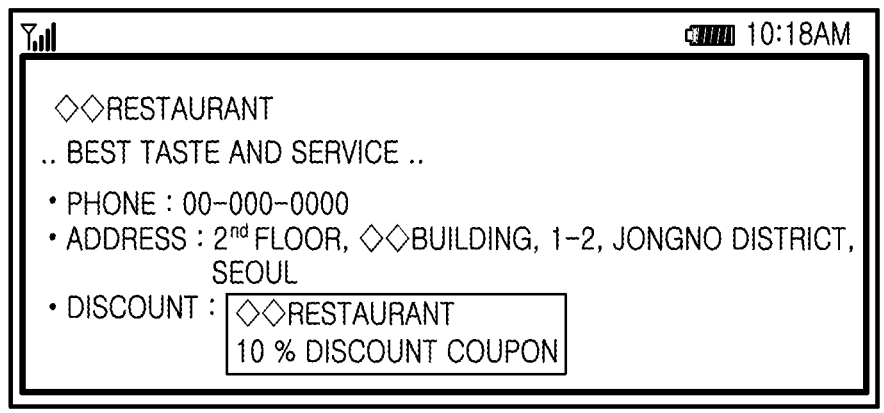

FIGS. 7A and 7B illustrate an example of advertisement information displayed on a screen.

Referring to FIGS. 7A and 7B, it is assumed in this case that a user specifies a restaurant as a preference item. When an advertisement is received, an initial screen may be configured with a list of restaurants located in a cell coverage area of an RAS as shown in FIG. 7A. In this case, a business office with a high class may be located at an upper position (e.g. a first page) of the list.

When the user selects an item from the screen of FIG. 7A to check details of a specific business office, a more detailed screen of FIG. 7B appears. As shown in FIG. 7B, the additional details may include a phone number, an address, discount information (e.g., an electronic coupon, etc.) and the like for the specific business office.

Figure 6:
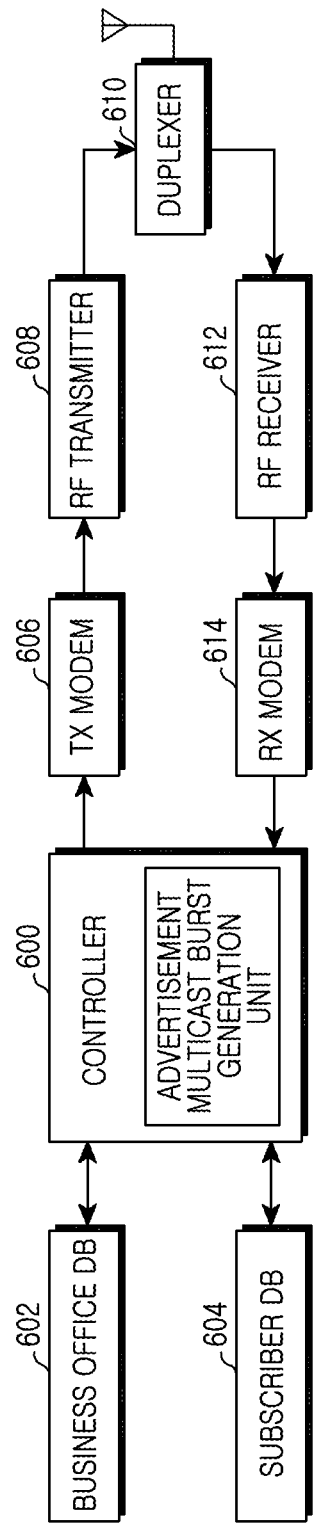
FIG. 6 is a block diagram illustrating a structure of an RAS in a wireless communication system according to an exemplary embodiment of the present invention.

FIG. 6 is a block diagram illustrating a structure of an RAS in a wireless communication system according to an exemplary embodiment of the present invention.

Referring to FIG. 6, the RAS includes a controller 600, a business office DB 602, a subscriber DB 604, a Tx modem 606, a Radio Frequency (RF) transmitter 608, a duplexer 610, an RF receiver 612, and an Rx modem 614.

The Tx modem 606 modulates Tx data (i.e., a burst, a packet, or a message) received from the controller 600 into a baseband signal. When using an OFDM system, the Tx modem 606 may include a channel encoder, an interleaver, a modulator, an Inverse Fast Fourier Transform (IFFT) operator, etc. When using a CDMA system, the IFFT operator may be replaced with a code spreading modulator or the like.

The RF transmitter 608 converts the baseband signal received from the Tx modem 606 into an RF signal. The duplexer 610 transmits a Tx signal (i.e., a DL signal) received from the RF transmitter 608 through an antenna according to a duplexing scheme, and provides an Rx signal (i.e., a UL signal) received through the antenna to the RF receiver 612. The RF receiver 612 converts the RF signal received from the duplexer 610 into a baseband signal.

The Rx modem 614 demodulates the Rx signal received from the RF receiver 612 into a baseband signal. When using the OFDM system, the Rx modem 614 may include a Fast Fourier Transform (FFT) operator, a demodulator, a deinterleaver, a channel decoder, etc. When using the CDMA system, the FFT operator may be replaced with a code despreading demodulator.

The controller 600 controls operations of the RAS, and performs a process for a protocol layer which is a higher layer of a physical layer. The business office DB 602 stores information regarding business offices located in a cell coverage area of the RAS and which is received from the information provider server 26 of FIG. 1. For each business office, the information regarding the business offices may include an item type (e.g., a restaurant, a gas station, an accommodation, a hypermarket, etc.), an address, a phone number, event information (e.g., discount information, an electronic coupon, etc.), a homepage address link, a class (e.g., premium, gold, silver, bronze, etc.), etc.

The subscriber DB 604 manages information regarding MSs currently accessing the RAS. That is, for each MS, the subscriber DB 604 may include information regarding whether the MS subscribes to an advertisement service. If the MS is a subscriber of the advertisement service, the subscriber DB 604 may include information specific to the MS such as a preference item list, a preference time, etc. Further, for each item, the subscriber DB 604 may manage a list (i.e., a multicast group) of MSs that desire to receive a corresponding item, an MCID allocated to that item, etc.

Hereinafter, an exemplary operation of the RAS having the structure of FIG. 6 will be described.

Upon detecting an initial access of an MS, the controller 600 performs authentication on the MS by interoperating with the AAA sever 16 of FIG. 1 in a Core Service Network (CSN). If authentication is successful, the controller 600 confirms subscription information of the MS to determine whether the MS is a subscriber of the advertisement service. If the MS is a subscriber of the advertisement service, the controller 600 determines a preference item and a preference time from the subscription information, and joins the MS to a corresponding multicast group according to the determined preference item and preference time. Further, the controller 600 transmits to the MS the preference time and an MCID of at least one multicast group in which the MS is joined. For example, the controller 600 generates a DSA-REQ message including the MCID and delivers the generated DSA-REQ message to a physical layer entity. The DSA-REQ message delivered to the physical layer entity is subjected to physical layer processing and is then transmitted to the MS.

The controller 600 examines Tx periods for all items. The Tx periods for all items may be identical to or different from one another. Even if the Tx periods are identical to one another, Tx times may be regulated to be different from one another. If an advertisement Tx time elapses according to the Tx period, the controller 600 reads a business office list of a corresponding item from the business office DB 602, configures an advertisement multicast burst including the read business office list, and delivers the configured advertisement multicast burst to the physical layer entity. The advertisement multicast burst delivered to the physical layer entity is subjected to physical layer processing and is then transmitted to MSs belonging to a corresponding multicast group.

According to an exemplary embodiment of the present invention, an RAS classifies information regarding business offices located in a cell coverage area of the RAS for all items, and multicasts advertisement information of the classified items to pre-registered MSs, thereby maximizing advertisement efficiency. In other words, the MSs may receive practical information regarding business offices located nearby and also may only receive pre-registered information during a pre-registered time period. Thus, efficiency of information used by a user may be maximized.

In the aforementioned exemplary embodiment of the present invention, it is described that an MCID for a preference item is reported for individual MSs. According to another exemplary embodiment of the present invention, an MCID list for all items supported in a system may be broadcast to the MSs using a broadcast message such as a Downlink Channel Descriptor (DCD). In this case, the MSs may include and manage a mapping table of "item vs. MCID" in an application layer. If a user selects a preference item, the application layer of the MSs delivers an MCID corresponding to the selected preference item to a MAC layer, and the MAC layer delivers a burst corresponding to the MCID to the application layer by performing decoding. Accordingly, it is possible to reduce a signaling overhead generated when the MCID is reported to the individual MSs. However, an interface between these protocol layers should be implemented.

As described above, exemplary embodiments of the present invention have an advantage in that an information service differentiated for a user may be provided by transmitting region-specific information to all RASs. In addition, since the user may receive region-specific information and user preference information, the user may obtain practical information required when the user visits a specific region.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of operating a Radio Access Station (RAS) in a wireless communication system, the method comprising:
receiving information regarding business offices located in a cell coverage area of an RAS from a network entity of a core service network;
classifying the received business office information into a plurality of business items for an advertisement, and storing the classified information in a Data Base (DB);
allocating a Multicast Connection IDentifier (MCID) for each of the plurality of the business items;
determining a transmission period for each of the plurality of the business items;
obtaining a business office list of a corresponding business item from the DB when a Transmit (Tx) time elapses according to the Tx period;
generating an advertisement multicast burst including the obtained business office list; and
multicasting the generated advertisement multicast burst to Mobile Stations (MSs),
wherein a plurality of the MCIDs corresponding to a plurality of preference business items according to a plurality of advertisement service subscriptions of the MSs are transmitted to the MSs,
the generated advertisement multicast burst includes the business office list for each of the plurality of preference business items, and
wherein the determining of the transmission period for each of the plurality of the business items comprises considering a wakeup period in an idle state of MSs that desire a corresponding business item.

2. The method of claim 1, wherein, for each business office, the business office information comprises at least one of a business item type for the advertisement, an address, a phone number, event information, a homepage address link, and a class.

3. The method of claim 1, wherein information regarding a business office having a high class is located in at least one of an upper position and a first page of the business office list.

4. The method of claim 1, further comprising managing a multicast group for each of the plurality of the business items.

5. The method of claim 1, further comprising:
upon detecting an access of a new MS, obtaining subscription information of the MS by performing authentication;
determining whether the MS is a subscriber of an advertisement service using the subscription information;
if the MS is the subscriber of the advertisement service, determining at least one of a preference business item and a preference time using the subscription information;
joining the MS to a corresponding multicast group using at least one of the preference business item and the preference time; and
transmitting to the MS at least one of the preference time and the MCID of at least one multicast group in which the MS is joined.

6. The method of claim 5, wherein the transmitting of the MCID comprises transmitting the MCID and the preference time to the MS using at least one of a broadcast message, a message exchanged for the initial access process, and a Dynamic Service Addition (DSA) message.

7. A method of operating a Mobile Station (MS) in a wireless communication system, the method comprising:
receiving at least one of a Multicast Connection IDentifier (MCID) for a preference business item and a pre-registered preference time from a Radio Access Station (RAS) in an initial access process;
determining a time zone for activating the advertisement reception according to the received preference time;
determining whether an advertisement multicast burst corresponding to the MCID is received from the RAS;
if the advertisement multicast burst is received, determining whether advertisement reception is currently activated;
if the advertisement reception is currently activated, obtaining information regarding the preference business item by decoding the received advertisement multicast burst; and
reproducing information regarding the preference business item using an application program, wherein the reproducing of the information comprises displaying the information regarding the preference business item on a portion of a screen without interfering with another application,
wherein the received MCID is based on a plurality of advertisement service subscriptions of the MS and is allocated for each of a plurality of the business items.

8. The method of claim 7, further comprising, if the advertisement reception is inactivated, discarding the received advertisement multicast burst.

9. The method of claim 7, further comprising determining at least one of an activation of the advertisement reception and a time zone of the advertisement reception according to a user setting.

10. The method of claim 7, wherein the receiving of the MCID comprises receiving the MCID using at least one of a broadcast message, a message exchanged for the initial access process, and a Dynamic Service Addition (DSA) message.

11. The method of claim 7, wherein the advertisement multicast burst comprises information regarding a business office located in a cell coverage area of the RAS, and the business office information comprises at least one of an address, a phone number, event information, and a homepage address link of the business office.

12. A Radio Access Station (RAS) apparatus in a wireless communication system, the apparatus comprising:
a first Data Base (DB) for storing information regarding business offices located in a cell coverage area of an RAS and received from an information provider server;
a second DB for determining whether a Mobile Station (MS) accessing the RAS is a subscriber of an advertisement service, and, if the MS is the subscriber of the advertisement service, for managing a preference business item list and a preference time;
a third DB for managing a list of MSs that desire to receive a corresponding business item among a plurality of business items for an advertisement which are classified based on the information and a Multicast Connection IDentifier (MCID) allocated to the corresponding business item;
a controller for determining a Transmit (Tx) period for each of the plurality of the business items, and if a Tx time for the Tx period elapses, for obtaining a business office list of the corresponding business item from the first DB and for generating an advertisement multicast burst including the obtained business office list, wherein the determining of the Tx period for each of the plurality of the business items comprises considering a wakeup period in an idle state of MSs that desire a corresponding business item; and a transmitter for performing physical layer processing on the advertisement multicast burst received from the controller to multicast the processed advertisement multicast burst to pre-registered MSs, wherein a plurality of the MCIDs corresponding to a plurality of preference business items according to a plurality of advertisement service subscriptions of the MSs are transmitted to the MSs, the generated advertisement multicast burst includes the business office list for each of the plurality of preference business items.

13. The apparatus of claim 12, wherein, if an initial access of the MS is detected, the controller performs authentication on the MS by interoperating with an authentication server, and if authentication is successful, determines whether the MS is a subscriber of the advertisement service using subscription information of the MS, if the MS is the subscriber of the advertisement service, determines at least one of a preference business item and a preference time, and transmits at least one of the preference time and the MCID according to the preference business item to the MS.

14. The apparatus of claim 12, wherein, for each business office, the business office information comprises at least one of an business item type, an address, a phone number, event information, a homepage address link, and a class.

15. A Mobile Station (MS) apparatus in a wireless communication system, the apparatus comprising:

a controller for receiving at least one of a Multicast Connection IDentifier (MCID) for a preference business item and a pre-registered preference time from a Radio Access Station (RAS) in an initial access process, for determining a time zone of the received preference time, for determining whether an advertisement multicast burst corresponding to the MCID is received from the RAS, and, if the advertisement multicast burst is received, for determining whether advertisement reception is currently activated;

a decoder for determining information regarding the preference business item by decoding the received advertisement multicast burst if the advertisement reception is activated; and a reproducer for reproducing information regarding the preference business item using an application program, wherein the reproducing of the information comprises displaying the information regarding the preference business item on a portion of a screen without interfering with another application, wherein the MCID received by the controller is based on a plurality of advertisement service subscriptions of the MS and is allocated for each of a plurality of the business items.

16. The apparatus of claim 15, wherein, if the advertisement reception is inactivated, the decoder discards the received advertisement multicast burst.

17. The apparatus of claim 15, wherein the controller determines a time zone for activating the advertisement reception according to the received preference time.

18. The apparatus of claim 15, wherein the controller determines at least one of an activation of the advertisement reception and a time zone of the advertisement reception according to a user setting.

19. The apparatus of claim 15, wherein the MCID is received using at least one of a broadcast message, a message exchanged for the initial access process, and a Dynamic Service Addition (DSA) message.

20. The apparatus of claim 15, wherein the reproducer displays the information regarding the preference business item on a portion of a screen without interfering with another application.

21. The apparatus of claim 15, wherein the advertisement multicast burst comprises information regarding a business office located in a cell coverage area of the RAS, and the business office information comprises at least one of an address, a phone number, event information, and a homepage address link of the business office.

* * * * *